US010124764B1

(12) United States Patent
Ahmed et al.

(10) Patent No.: US 10,124,764 B1
(45) Date of Patent: Nov. 13, 2018

(54) INTRUSION DETECTION SYSTEM BASED ON 2-POINT PROFILING OF SIGNAL CHARACTERISTICS

(71) Applicant: Intel Corporation, Santa Clara, CA (US)

(72) Inventors: Shabbir Ahmed, Beaverton, OR (US); Marcio Rogerio Juliato, Portland, OR (US); Li Zhao, Beaverton, OR (US); Manoj R. Sastry, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/720,478

(22) Filed: Sep. 29, 2017

(51) Int. Cl.
*B60R 25/10* (2013.01)
*B60R 16/023* (2006.01)
*H04L 29/06* (2006.01)
*H04L 12/40* (2006.01)

(52) U.S. Cl.
CPC ........ *B60R 25/1004* (2013.01); *B60R 16/023* (2013.01); *H04L 12/40* (2013.01); *H04L 63/1425* (2013.01); *H04L 2012/40273* (2013.01)

(58) Field of Classification Search
CPC ... B60R 25/1004; B60R 16/023; H04L 12/40; H04L 63/1425; H04L 2012/40273
USPC ......................................... 340/508, 507, 511
See application file for complete search history.

(56) References Cited

U.S. PATENT DOCUMENTS

| 4,214,308 | A  * | 7/1980  | Carp      | F02D 41/04 |
|           |      |         |           | 123/445    |
| 6,288,638 | B1 * | 9/2001  | Tanguay   | G01K 7/20  |
|           |      |         |           | 340/511    |
| 2005/0128796 | A1 * | 6/2005  | Hoffmann  | G11C 7/1051 |
|           |      |         |           | 365/158    |
| 2005/0286921 | A1 * | 12/2005 | Yonekawa  | G03G 15/2039 |
|           |      |         |           | 399/69     |
| 2012/0294045 | A1 * | 11/2012 | Fornage   | H02M 7/217 |
|           |      |         |           | 363/17     |

(Continued)

OTHER PUBLICATIONS

Moore, Michael R, et al., "Modeling inter-signal arrival times for accurate detection of CAN bus signal injection attacks", CISRC '17, Oak Ridge, TN, USA, (2017), 4 pgs.
Song, Hyun Min, et al., "Intrusion detection system based on the analysis of time intervals of CAN messages for in-vehicle network", International Conference on Information Networking (ICOIN), (2016), 63-68.

*Primary Examiner* — Emily C Terrell
*Assistant Examiner* — Rufus Point
(74) *Attorney, Agent, or Firm* — Schwegman Lundberg & Woessner, P.A.

(57) ABSTRACT

Various systems and methods for intrusion detection are described herein. An electronic device for intrusion detection includes memory circuitry to store a set of signature voltage ratios and a corresponding set of node identifiers, each node identifier corresponding to a unique signature voltage ratio; and security circuitry to: compare voltages received at a first and second measuring point on a bus, the voltages resulting from a message transmitted by a sending node on the bus, the first measuring point providing a first voltage and the second measuring point providing a second voltage; calculate a test voltage ratio from the first voltage and the second voltage; determine whether the test voltage ratio is in the set of signature voltage ratios; and initiate a security response based on whether the test voltage ratio is in the set of signature voltage ratios.

25 Claims, 6 Drawing Sheets

(56) References Cited

U.S. PATENT DOCUMENTS

2016/0091568 A1* 3/2016 Weber ................. G01R 31/343
　　　　　　　　　　　　　　　　　　　　　　　　318/490
2017/0318044 A1* 11/2017 Dagmi .................... H04L 12/40

* cited by examiner

| NODE | VOLTAGE AT MP | | RATIO (VMP1 / VMP2) |
|---|---|---|---|
| ECU 1 | VMP1 | 3.25 | 1.0202 |
| | VMP2 | 3.1855 | |
| ECU 2 | VMP1 | 3.2939 | 1.0061 |
| | VMP2 | 3.2738 | |
| ECU 3 | VMP1 | 3.3488 | 0.9917 |
| | VMP2 | 3.3768 | |
| ECU 4 | VMP1 | 3.2793 | 0.9764 |
| | VMP2 | 3.3584 | |

INTRUSION DETECTION SYSTEM BASED ON 2-POINT PROFILING OF SIGNAL CHARACTERISTICS

TECHNICAL FIELD

Embodiments described herein generally relate to automotive security systems, and in particular, to systems and methods for intrusion detection.

BACKGROUND

Intrusion Detection Systems (IDSs) are used to detect anomalies and initiate recovery mechanisms. An IDS may be used in an automotive system, which has become increasingly computerized in recent years. Various attacks have been demonstrated on automotive systems, which aim to disable, overtake, or reprogram portions of an automotive component. An IDS in an automotive system is useful to defend against such attacks and ensure the safe operation of the vehicle.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

In the following description, for purposes of explanation, numerous specific details are set forth in order to provide a thorough understanding of some example embodiments. It will be evident, however, to one skilled in the art that the present disclosure may be practiced without these specific details.

One common automotive in-vehicle network is the "Controller Area Network" bus (CAN bus). The CAN bus is used to connect various systems together in a vehicle, such as the engine control unit, transmission, airbags, antilock braking system (ABS), cruise control, power steering, audio systems, power windows, collision avoidance systems, etc.

Automotive CAN buses are implemented as a twisted pair of wires with electronic control units (ECUs) connected at different points on this bus. Every wire has resistance, which means there will be voltage drop across the line depending on the current flowing through it. Placing two measurement points, MP1 and MP2, at the ends of the bus provides two different voltage readings of signals from a particular ECU on the bus. Thus, each measurement point will have a unique reading due to the different voltage drops caused by the length of the wire between the particular transmitting ECU and each measurement point.

Thus, this disclosure provides a new and improved IDS scheme for in-vehicle networks that utilizes two measurement points to identify the source of intrusion. Specifically, this scheme describes an approach based on observing the effects that the intrinsic physical characteristics of the bus (resistance, capacitance, inductance, etc.) have on the signal of the transmitting ECU. For instance, the voltage driven by an ECU located at a certain position of the CAN bus will incur a voltage drop along the wire due to the wire's inherent resistance. As a result, the difference in the observed voltages at the two different measuring points MP1 and MP2, may serve to determine the relative position of the transmitting ECU in the bus. Using this two-point measurement of this certain physical characteristic, the system is able to determine which ECU is transmitting a message and detect any anomaly using pre-determined rules, e.g. an infotainment ECU cannot send a command to the ABS ECU. Various other aspects are discussed throughout this document. Aspects may be combined and modified to incorporate one aspect with one or more other aspects. Further, while this is generally discussed in view of a CAN bus, it may be extended to other types of automotive buses.

Figure 1:
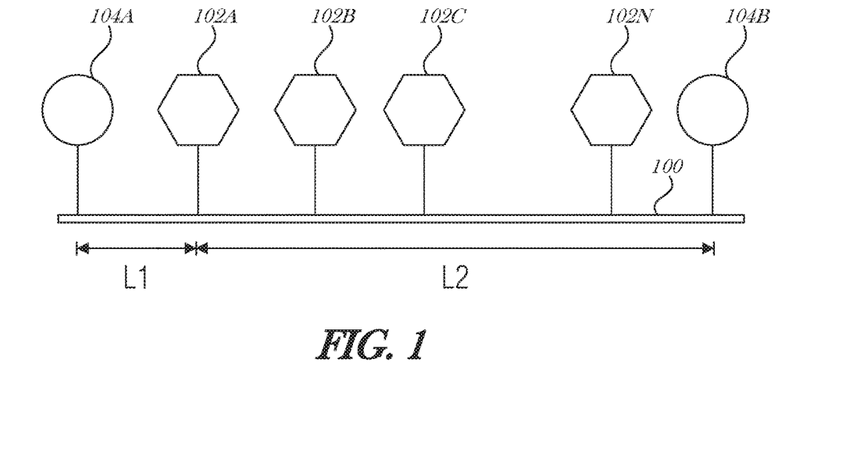
FIG. 1 is a diagram illustrating a generic bus according to an embodiment.

FIG. 1 is a diagram illustrating a generic bus 100 according to an embodiment. The bus 100 has a number of nodes 102A, 102B, ..., 102N (collectively referred to as 102) connected to the bus 100. Each node 102 may broadcast and receive signals on the bus 100. A first measurement node 104A and a second measurement node 104B (collectively referred to as 104) are located near the ends of the bus 100. The measurement nodes 104 are configured to monitor the bus 100 and detect the voltage of signals from the nodes 102. The placement of the measurement nodes 104 is not critical, so long as the measurement nodes 104 are placed apart from each other. In a specific embodiment, the measurement nodes 104 are placed such that all other nodes 102 are between the measurement nodes 104.

A particular node, such as node 102A, may broadcast a signal on the bus 100. The signal may be generated with a voltage, which when received at the measurement nodes 104 is reduced by some amount due to resistance in the bus 100 between the transmitting node (e.g., node 102A) and the measurement nodes 104. The voltage detected at the first measurement node 104A is referred to as VMP1 and the voltage detected at the second measurement node 104B is referred to as VMP2. The ratio of VMP1 and VMP2 is determined (VMP1/VMP2) and used as a signature of the node 102A. This ratio (VMP1/VMP2) is stored along with an identifier of the node 102A.

As illustrated in FIG. 1 it may be noticed that the voltage at the measurement nodes 104 of the signals sent by the node 102 will be impacted by the lengths L1 and L2 respectively. Leveraging this difference in the length, there are various physical attributes that may be used to construct an IDS. This type of IDS may be implemented for any broadcast bus with nodes hanging on to the bus. As such, the bus 100 may be a CAN bus. In such an embodiment, each node 102 may be an ECU. In other embodiments, the bus 100 may be a part of another type of vehicle network (e.g., FlexRay, Time- Trigger Protocol (TTP), Vehicle Area Network (VAN), etc.), or may be part of another type of communication network.

Figure 2:
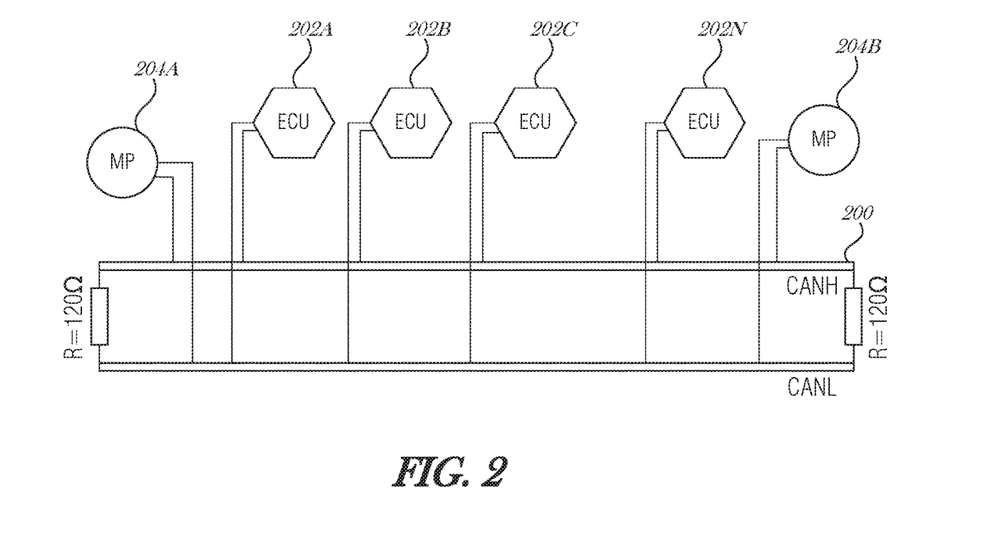
FIG. 2 is another diagram illustrating a CAN bus, according to an embodiment.

FIG. 2 is another diagram illustrating a CAN bus 200, according to an embodiment. Automotive CAN buses are implemented as a twisted pair of wires with ECUs (e.g., ECU 202A. 202B, ..., 202N) connected at different points on this bus. The ends of the CAN bus 200 are terminated with 120Q resistors.

ECUs 202 are able to send and receive messages to/from other ECUs 202 on the bus using a broadcast mechanism with nondestructive arbitration. Each message complies with a CAN bus protocol that includes a plurality of bits arranged in a plurality of fields. The fields include at least one bit, with each bit corresponding to a logic 0 ("zero bit") or a local 1 ("one bit").

Physically, for a 2-wire bus, each bit may be represented by a differential voltage applied across the CAN bus 200. In the CAN bus protocol, for example, a first wire (e.g., conductor) is labeled CANH (high bus line) 206 and a second wire is labeled CANL (low bus line) 208. A transmitting ECU (e.g., ECU 102A) is configured to apply a first voltage, VCANH (i.e., high bus line voltage), to CANH and a second voltage, VCANL (i.e., low bus line voltage), to CANL in order to transmit a bit. In the CAN bus protocol, a 0 bit is considered "dominant" and a 1 bit is considered "recessive". In other words, a transmitting ECU is configured to actively drive the CANH and CANL lines to respective voltages to transmit a 0 bit and to passively pull (up and/or down) the CANH and CANL lines to respective voltages to transmit a 1 bit. Thus, if a first ECU is transmitting a 0 bit and a second ECU is transmitting a 1 bit, then the bus state will correspond to the 0 bit. This configuration allows nondestructive arbitration and collision avoidance. In other words, according to the CAN bus protocol, the second ECU will detect a bus state different from its transmitted bit and will halt transmission.

Figure 3:
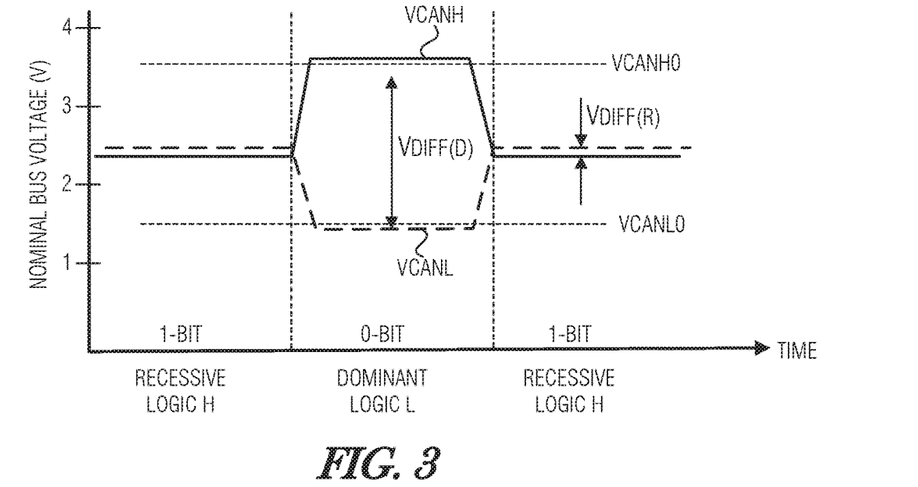
FIG. 3 is a diagram illustrating nominal recessing and dominant bus voltages for a CAN bus, according to an embodiment.

Signaling is further illustrated in FIG. 3, which is a diagram illustrating nominal recessing and dominant bus voltages for a CAN bus, according to an embodiment. When an ECU sends a 0 bit, it does so by increasing a first voltage (VCANH coupled to CANH) to at least VCANH0 and decreasing a second voltage (VCANL coupled to CANL) to at least VCANL0. For example, VCANH0 may be about 3.5V, while the VCANL0 may be about 1.5V. As used herein, "about" means plus or minus one percent.

In the recessive state, either the CAN bus 200 is idle or an ECU is transmitting a logic 1. In the dominant state, at least one ECU is transmitting a logic 0. Thus, a differential voltage detected across the CANH and CANL lines during the dominant state corresponds to Vdiff(D)=VCANH0−VCANL0, and a differential voltage detected across the CANH and CANL lines during the recessive state corresponds to Vdiff(R)=Vcc/2, or approximately 2.5V. For example, a 0 bit may correspond to VCANH nominally equal to 3.5V (VCANH0) and VCANL nominally equal to 1.5V (VCANL0), on CANH and CANL, respectively. However, due to process variations in the transistors and diodes within the ECUs' transceivers, when sending a 0 bit, each transmitter may output voltages that differ from the nominal values. For example, the actual output voltages for a number of ECUs may have a distribution, e.g., a Gaussian distribution, with a corresponding mean value and a corresponding standard deviation. These variations in CANH or CANL voltage outputs per transmitter may be utilized to determine a unique signature for each transmitter and, thus, each ECU.

Every wire has resistance, which means there will be voltage drop across the line depending on the current flowing through it. Considering the two points of measurements, as shown in FIG. 2 as measurement points 204A and 204B (collectively referred to as 204), the ECU output voltage will reach each measurement points 204 at different levels. Based on how far away the ECU is on the CAN bus 200 from the measurement points 204, each measurement points 204 will have a unique reading due to the different voltage drops caused by the length of the wire in between them.

Figure 4:
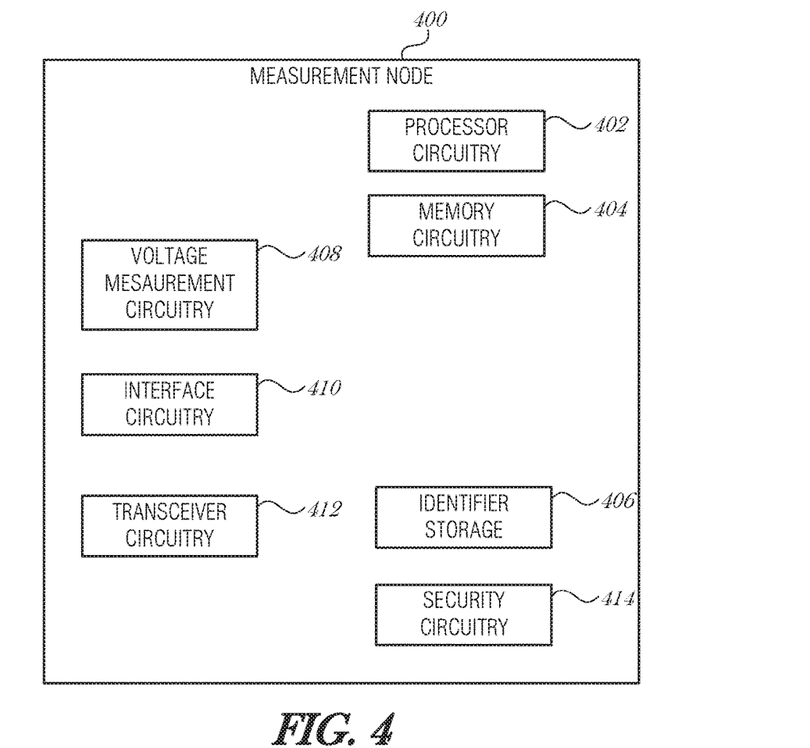
FIG. 4 illustrates a measurement node, according to an embodiment.

FIG. 4 illustrates a measurement node 400, according to an embodiment. Example embodiments of the measurement node 400 may be measurement node 104 or measurement point 204, from FIGS. 1 and 2, respectively. Measurement node 400 includes processor circuitry 402, memory circuitry 404, identifier storage 406, voltage measurement circuitry 408, interface circuitry 410, transceiver circuitry 412, and security circuitry 414.

Processor circuitry 402 is capable of executing machine-readable instructions and may take the form of any of a number of possible processors, such as an Intel® Atom processor, an Intel® Quark processor, etc. Memory circuitry 404 is capable of storing computer-readable instructions and/or data. Memory circuitry 404 may include volatile and/or nonvolatile memory. Memory circuitry 404 may be configured to contain identifier storage 406.

Interface circuitry 410 may include an analog to digital converter (ADC) circuitry, digital to analog (DAC) circuitry, multiplexer circuitry, etc.

Transceiver circuitry 412 is generally configured to send/receive messages to/from, for example, other ECUs. Thus, transceiver circuitry 412 may include a transmitter and a receiver configured to transmit or receive electrical signals carried by a bus (e.g., CAN bus 200). The messages sent or received by transceiver circuitry 412 may be in the form of an electric signal, e.g., one or more voltages. A received message may be converted from an analog voltage into a digital form by interface circuitry 410 (e.g., ADC). Voltage measurement circuitry 408 may capture the output (i.e., a digital value) from the interface circuitry 410 and determine (i.e., measure) the voltage(s) corresponding to one or more bits of the received message. These measured voltages may be used to validate the message sender, as will be explained in further detail below.

Security circuitry 414 collects voltages from the voltage measurement circuitry 408. Security circuitry 414 also is able to decode the message received by transceiver circuitry 412 and obtain the identifier of the message sender. In the base CAN bus protocol, this is the first 11 bits of the message after the start of frame (SOF) bit. In an extended CAN bus protocol, the sender identifier may be 29 bits, split across two fields. Security circuitry 414 may collect a number of voltage samples across a message to determine the voltage associated with the message/sender. The voltage samples may be processed to obtain a signature voltage for the sender. In various embodiments, the voltage samples may be processed to obtain the signature voltage, such as by selecting the averages voltage observed, the median voltage observed, the maximum voltage observed, the minimum voltage observed, a central tendency of the voltages observed, or the like. Security circuitry may communicate or cause the measurement node 400 to communicate with another measurement node, or with a controller node, in order to compare the voltages observed at the two measurement nodes on the bus.

For instance, one of the two measurement nodes may be designated as a "master" node, and the other measurement node as the "slave" node. In this arrangement, the slave measurement node transmits the voltage obtained from a message to the master measurement node. The master measurement node may then compute a ratio of the voltages observed at each measurement node to obtain a signature ratio. This signature ratio is then used to authenticate the sending node that transmitted the message under test.

In other embodiments, a different node may be implemented (e.g., a controller node), that is configured to obtain the observed voltages from two or more measurement nodes on the bus, calculate the signature ratio, and control security remedial functions based on the resulting signature ratio in view of known signature ratios. The controller node may be on-bus (e.g., on the same bus as the ECU sending node and the measurement nodes, or off-bus (e.g., on a different network that is in communication with the measurement nodes, but not on the same medium as the ECU sending node).

Figure 5:
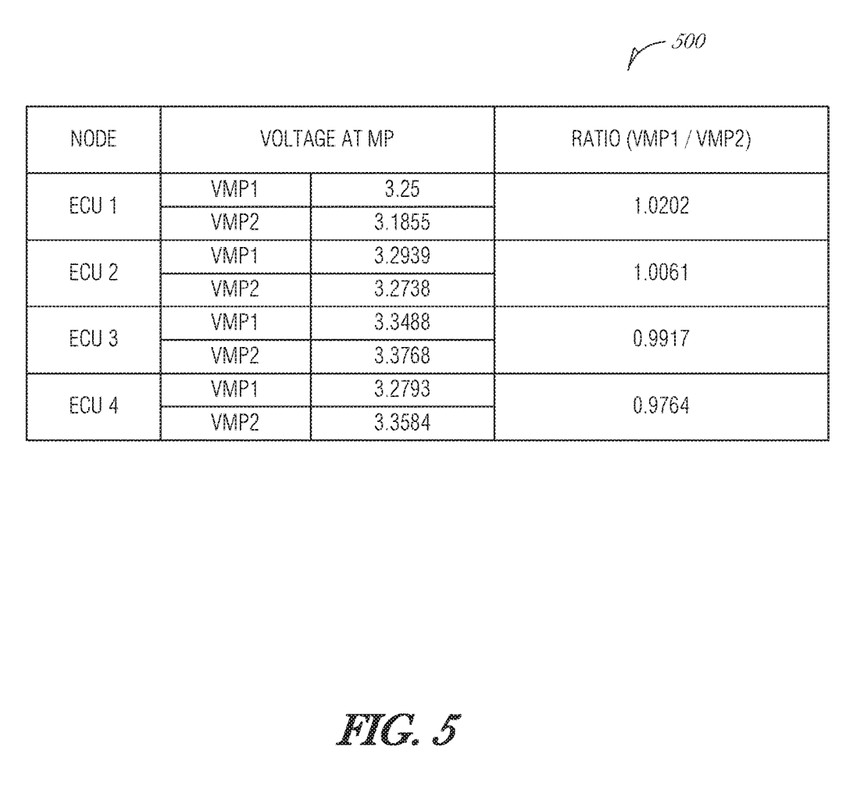
FIG. 5 is an example table, according to an embodiment.

Identifier storage 406 may be conceptualized as a table containing relationships between unique node identifiers and ratios of voltages received at two measurement points. FIG. 5 is an example table 500, according to an embodiment. In the table 500, four ECUs are depicted with corresponding voltages measured at measuring point one (VMP1) and measuring point two (VMP2). ECU identifiers (e.g., 11-bit or 29-bit identifiers), are depicted as "ECU 1" through "ECU 4" in the table 500. The ratio of the voltages are included in the table 500. Identifier storage 406 may be arranged as various types of data structures, not just a flat table as depicted in FIG. 5.

The identifier storage 406 may include more or less information than what is depicted in FIG. 5. For instance, the identifier storage 406 may omit the received voltages and only include the final ratio value. In another instance, rules may be included in the table 500 or in corresponding related tables, which provide access control or other security measures. Rules may include permissions, such as that ECU1 is allowed to send messages to ECU2, but not to ECU3 or ECU4. Additional rules may be applied based on the identification of the ECUs.

ECUs may also be associated with a type (e.g., engine control, interior climate control, braking control, steering control, etc.) and rules may be designed to permit or deny actions based on the type of the sending ECU and the type of the receiving ECU. ECUs may also be permitted or restricted to communicate based on other factors, such as time of day, type of vehicle operation, vehicle operator identification, vehicle speed, and the like.

The traditional CAN message ID masquerading attack is thwarted since the system is able to utilize the location of the ECU to determine its identity and the ECU identity with the expected message IDs. Furthermore, by being able to determine the relative position of the ECU on the bus, it is now possible to mitigate voltage spoofing attacks. The reason behind it is that in order to match the expected voltages at both measuring points (consequently the expected ratio) the attacker would have to be in the exact same physical location of the authentic ECU. In other words the attacking ECU will have to try to match the voltage levels of a valid ECU measured at MP1 and MP2, but since it cannot replicate the same relative physical distance from the measuring points the voltages read at the MPs will not match. Thus, the system provides protection against both ECU impersonation and voltage impersonation.

In the CAN bus examples discussed so far, the voltage is measured on the CANH line. However, the same methodology may be applied to CANL independently, or in conjunction with CANH.

Further, while two measuring points (e.g., measuring nodes) are discussed in some of the examples, it is understood that more than two measuring points may be used. While using measuring points at the end of the bus ensure that all the transmitting nodes are between the measuring points, other configurations may be used where the measuring points are not at the ends. Additionally, more than two measuring points may be used. When more than two measuring points are used, then combinations of the ratios obtained from the different measuring points may be used to define an ECU signature. For instance, with three measuring points with voltages VMP1, VMP2, and VMP3, multiple ratios are available including VMP1/VMP2, VMP1/VMP3, VMP2/VMP1, and VMP2/VMP3. Several ratios may be used in combination to help reduce false positives.

Figure 6:
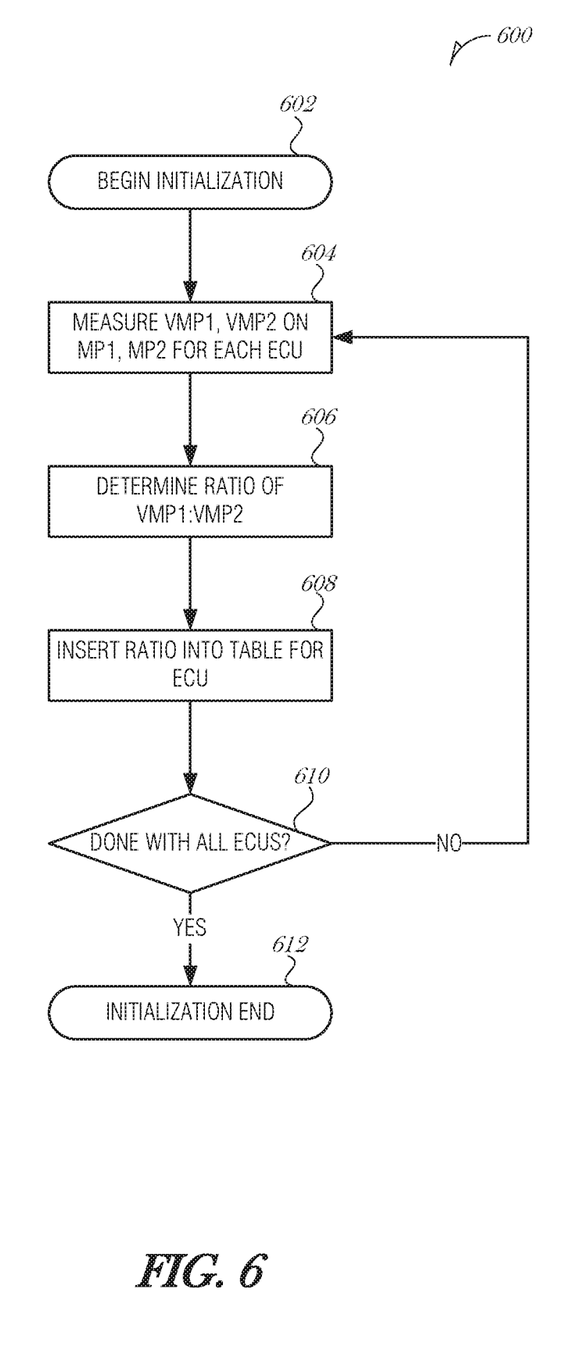
FIG. 6 is a flowchart illustrating an initialization process, according to an embodiment.

FIG. 6 is a flowchart illustrating an initialization process 600, according to an embodiment. At operation 602, the initialization process 600 begins. The initialization process 600 may be executed during the manufacture or assembly of a vehicle, for instance, when a CAN bus is installed in a vehicle. The initialization process 600 may be executed after any changes to components on a bus. For instance, after a component is added to a bus, the component's voltage output may be measured by the measuring points to establish a signature voltage ratio. All nodes on a bus may be re-initialized in such a situation. Alternatively, only the newly added node may be evaluated. The initialization process 600 may be executed after changes to the structure of the bus. For example, if the bus length is changed, especially between measuring points, then the initialization process 600 may be used to ensure that voltage ratios are accurate.

At operation 604, voltages VMP1 and VMP2 are measured at measuring points MP1 and MP2, respectively. During initialization, each node on the bus may take a turn and broadcast one or more signals on the bus. Alternatively, the initialization may occur passively during normal operations. Voltages used in the ratios may represent the instantaneous voltage, or may be a representation of multiple sample voltages measured over time.

The ratio of the voltages is calculated (operation 606) and stored in a table where the voltages are associated with the ECU identifier (operation 608).

If all of the ECUs have been processed (decision block 610), then initialization ends (operation 612). Otherwise, more ECUs are processed by returning to operation 604 and repeating operations 604, 606, and 608.

Figure 7:
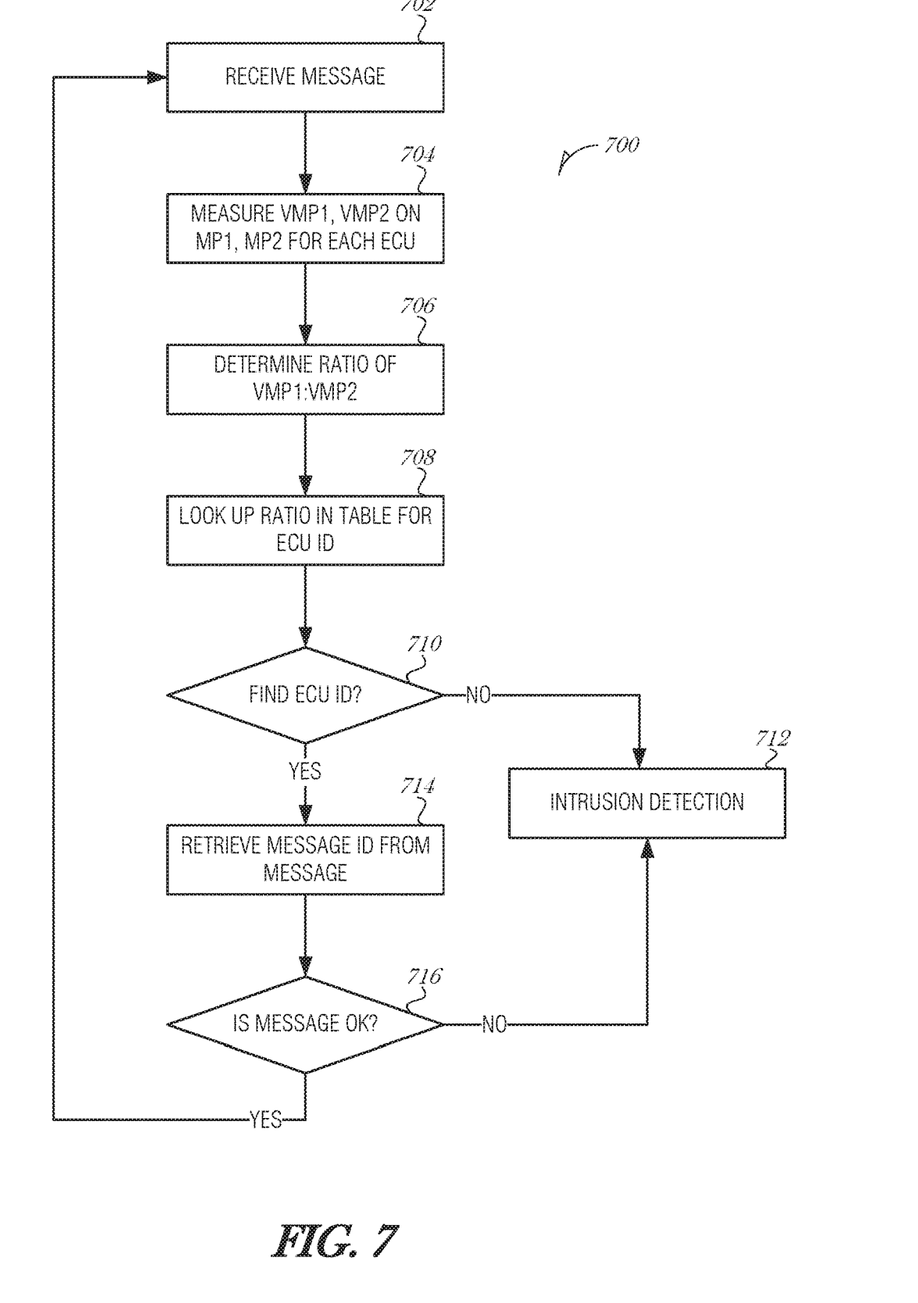
FIG. 7 is a flowchart illustrating a method for intrusion detection, according to an embodiment.

FIG. 7 is a flowchart illustrating a method 700 for intrusion detection, according to an embodiment. A message is received at a first measuring point (MP1) and a second measuring point (MP2), each measuring point on a bus (operation 702). The message may include a plurality of bits and is sent by a node on the bus. Very short messages, such as a single bit ACK message, may be ignored.

At operation 704, voltages are measured at the measuring points MP1, MP2. The voltages may be measuring using a variety of methods. In various embodiments, voltages of a message are measured based on a number of sample voltages obtained during receipt of the message, such as by determining an average voltage, a median voltage, a central tendency of voltages, or the like. Alternatively, the maximum or minimum voltage observed may be used. Each measuring point MP1, MP2 obtains a voltage VMP1, VMP2 respectively, based on which ever method is implemented.

In some embodiments, the ratio may be calculated on different portions of the same message. Since a CAN message is larger than a single bit, voltages may be sampled from several locations within the message, and the ratio of such voltages may be calculated from several locations within the message. An ECU signature (e.g., fingerprint) may be defined using a set of ratios.

A ratio of voltages VMP1 and VMP2 is determined (operation 706). The ratio is always determined using the same dividend and divisor, and is calculated as a decimal value of VMP1 divided by VMP2. The result of the division is referred to as a "signature ratio" that identifies the sending node.

At operation 708, the signature ratio is used to determine whether the sending node is a known node-whether the sending node's identifier is associated with the signature ratio. In particular, a table or other data structure is referenced with the signature ratio to determine whether it exists in the table, and if so, which identifier (e.g., ECU identifier) is associated with the signature ratio.

At decision block 710, if the signature ratio is not found, then it may be determined that the node is not valid (e.g., no known ECU identifier). The process flow continues to operation 712, where intrusion detection is flagged. Various types of remedial methods may be used, such as flagging the message in a security log, alerting a user or operator of the vehicle, blocking further messages from the source with the particular signature ratio, restarting the system, shutting the system down, or the like.

If, at decision block 710, the signature ratio is found in the table (or other data structure), then the corresponding node identifier is available. A message identifier is obtained from the message (operation 714). At decision operation 716, it is determined whether the message is approved based on various rules. The rules may specify which nodes or types of nodes are allowed to transmit which messages or types of messages. Based on the message identifier obtained at operation 714, and the node identifier determined at operation 710, one or more rules may be applied to determine whether the message is one that is expected or approved.

If the message is allowable, then the process flows back to operation 702, where the next message is received and processed. If the message is not allowable, then the process flows to operation 712, where possible intrusion detection is flagged. The intrusion detection may be associated with the node identifier (e.g., ECU ID) so that the system is able to disable further messages from the particular sending node. Other remedial operations may be executed, such as logging, shutting the system down, alerting a user, etc.

Embodiments may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

A processor subsystem may be used to execute the instruction on the machine-readable medium. The processor subsystem may include one or more processors, each with one or more cores. Additionally, the processor subsystem may be disposed on one or more physical devices. The processor subsystem may include one or more specialized processors, such as a graphics processing unit (GPU), a digital signal processor (DSP), a field programmable gate array (FPGA), or a fixed function processor.

Examples, as described herein, may include, or may operate on, logic or a number of components, modules, or mechanisms. Modules may be hardware, software, or firmware communicatively coupled to one or more processors in order to carry out the operations described herein. Modules may be hardware modules, and as such modules may be considered tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software; the general-purpose hardware processor may be configured as respective different modules at different times. Software may accordingly configure a hardware processor, for example, to constitute a particular module at one instance of time and to constitute a different module at a different instance of time. Modules may also be software or firmware modules, which operate to perform the methodologies described herein.

Circuitry or circuits, as used in this document, may comprise, for example, singly or in any combination, hardwired circuitry, programmable circuitry such as computer processors comprising one or more individual instruction processing cores, state machine circuitry, and/or firmware that stores instructions executed by programmable circuitry. The circuits, circuitry, or modules may, collectively or individually, be embodied as circuitry that forms part of a larger system, for example, an integrated circuit (IC), system on-chip (SoC), desktop computers, laptop computers, tablet computers, servers, smart phones, etc.

As used in any embodiment herein, the term "logic" may refer to firmware and/or circuitry configured to perform any of the aforementioned operations. Firmware may be embodied as code, instructions or instruction sets and/or data that are hard-coded (e.g., nonvolatile) in memory devices and/or circuitry.

"Circuitry," as used in any embodiment herein, may comprise, for example, singly or in any combination, hardwired circuitry, programmable circuitry, state machine circuitry, logic and/or firmware that stores instructions executed by programmable circuitry. The circuitry may be embodied as an integrated circuit, such as an integrated circuit chip. In some embodiments, the circuitry may be formed, at least in part, by the processor circuitry 402 executing code and/or instructions sets (e.g., software, firmware, etc.) corresponding to the functionality described herein, thus transforming a general-purpose processor into a specific-purpose processing environment to perform one or more of the operations described herein. In some embodiments, the processor circuitry 402 may be embodied as a stand-alone integrated circuit or may be incorporated as one of several components on an integrated circuit. In some embodiments, the various components and circuitry of the node 400 or other systems may be combined in a system-on-a-chip (SoC) architecture.

Figure 8:
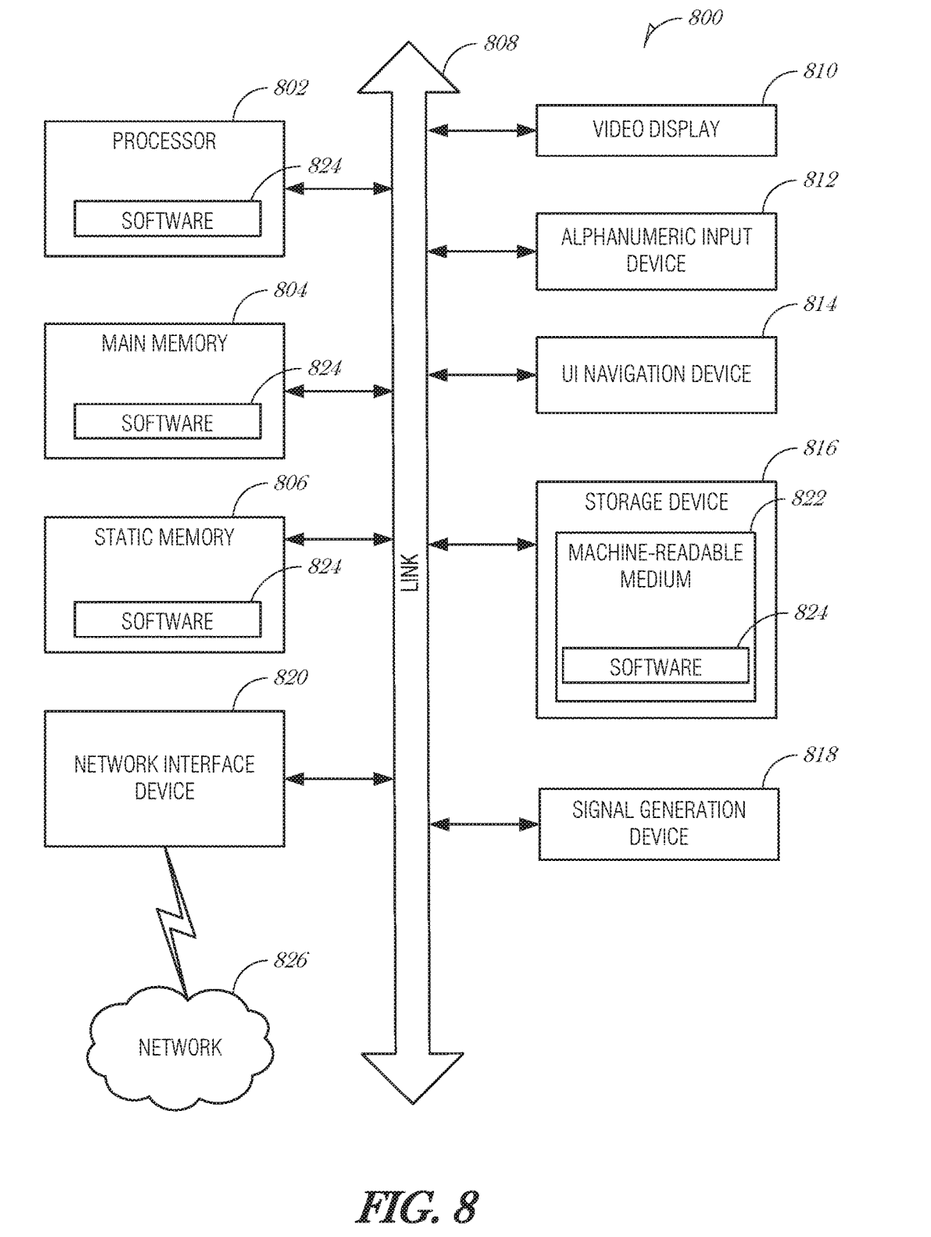
FIG. 8 is a block diagram illustrating an example machine upon which any one or more of the techniques (e.g., methodologies) discussed herein may perform, according to an embodiment.

FIG. 8 is a block diagram illustrating a machine in the example form of a computer system 800, within which a set or sequence of instructions may be executed to cause the machine to perform any one of the methodologies discussed herein, according to an embodiment. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be a head-mounted display, wearable device, personal computer (PC), a tablet PC, a hybrid tablet, a personal digital assistant (PDA), a mobile telephone, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 800 includes at least one processor 802 (e.g., a central processing unit (CPU), a graphics processing unit (GPU) or both, processor cores, compute nodes, etc.), a main memory 804 and a static memory 806, which communicate with each other via a link 808 (e.g., bus). The computer system 800 may further include a video display unit 810, an alphanumeric input device 812 (e.g., a keyboard), and a user interface (UI) navigation device 814 (e.g., a mouse). In one embodiment, the video display unit 810, input device 812 and UI navigation device 814 are incorporated into a touch screen display. The computer system 800 may additionally include a storage device 816 (e.g., a drive unit), a signal generation device 818 (e.g., a speaker), a network interface device 820, and one or more sensors (not shown), such as a global positioning system (GPS) sensor, compass, accelerometer, gyrometer, magnetometer, or other sensor.

The storage device 816 includes a machine-readable medium 822 on which is stored one or more sets of data structures and instructions 824 (e.g., software) embodying or utilized by any one or more of the methodologies or functions described herein. The instructions 824 may also reside, completely or at least partially, within the main memory 804, static memory 806, and/or within the processor 802 during execution thereof by the computer system 80X), with the main memory 804, static memory 806, and the processor 802 also constituting machine-readable media.

While the machine-readable medium 822 is illustrated in an example embodiment to be a single medium, the term "machine-readable medium" may include a single medium or multiple media (e.g., a centralized or distributed database, and/or associated caches and servers) that store the one or more instructions 824. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include nonvolatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 824 may further be transmitted or received over a communications network 826 using a transmission medium via the network interface device 820 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Bluetooth, Wi-Fi, 3G, and 4G LTE/LTE-A, 5G, DSRC, or WiMAX networks). The term "transmission medium" shall be taken to include any intangible medium that is capable of storing, encoding, or carrying instructions for execution by the machine, and includes digital or analog communications signals or other intangible medium to facilitate communication of such software.

Additional Notes & Examples

Example 1 is an electronic device for intrusion detection, the device comprising: memory circuitry to store a set of signature voltage ratios and a corresponding set of node identifiers, each node identifier corresponding to a unique signature voltage ratio; and security circuitry to: compare voltages received at a first and second measuring point on a bus, the voltages resulting from a message transmitted by a sending node on the bus, the first measuring point providing a first voltage and the second measuring point providing a second voltage; calculate a test voltage ratio from the first voltage and the second voltage; determine whether the test voltage ratio is in the set of signature voltage ratios; and initiate a security response based on whether the test voltage ratio is in the set of signature voltage ratios.

In Example 2, the subject matter of Example 1 includes, wherein the device comprises the first measuring point on the bus.

In Example 3, the subject matter of Example 2 includes, transceiver circuitry to receive the message transmitted on the bus; and voltage measurement circuitry to determine the first voltage.

In Example 4, the subject matter of Example 3 includes, wherein to determine the first voltage, the security circuitry is to: obtain a plurality of sample voltages from the message, provided by the voltage measurement circuitry; and calculate the first voltage form the plurality of sample voltages.

In Example 5, the subject matter of Example 4 includes, wherein to calculate the first voltage from the number of voltages, the security circuitry is to calculate an average voltage from the plurality of sample voltages, and use the average voltage as the first voltage.

In Example 6, the subject matter of Examples 4-5 includes, wherein to calculate the first voltage from the number of voltages, the security circuitry is to calculate a median voltage from the plurality of sample voltages, and use the median voltage as the first voltage.

In Example 7, the subject matter of Examples 1-6 includes, wherein the bus is a controller area network (CAN) bus.

In Example 8, the subject matter of Example 7 includes, wherein the voltages are off of a high bus line (CANH).

In Example 9, the subject matter of Examples 7-8 includes, wherein the voltages are off of a low bus line (CANL).

In Example 10, the subject matter of Examples 7-9 includes, wherein the voltages are off of a high bus line (CANH) and a low bus line (CANL), and wherein the test voltage ratio is associated with CANH and a second test voltage ratio is associated with CANL.

In Example 11, the subject matter of Examples 1-10 includes, wherein to initiate the security response, the security circuitry is to: determine that the test voltage ratio is not in the set of signature voltage ratios; and disable the sending node.

In Example 12, the subject matter of Examples 1-1 includes, wherein to initiate the security response, the security circuitry is to: determine that the test voltage ratio is not in the set of signature voltage ratios; and record the sending node in a security log.

In Example 13, the subject matter of Examples 1-12 includes, wherein to initiate the security response, the security circuitry is to: determine that the test voltage ratio is in the set of signature voltage ratios; determine a message identifier from the message; and determine whether the sending node is allowed to transmit the message with the message identifier.

In Example 14, the subject matter of Example 13 includes, wherein the security circuitry is to disable the sending node when the sending node is not allowed to transmit the message with the message identifier.

In Example 15, the subject matter of Examples 13-14 includes, wherein the security circuitry is to record the sending node in a security log when the sending node is not allowed to transmit the message with the message identifier.

Example 16 is a method of intrusion detection, the method comprising: implementing memory to store a set of signature voltage ratios and a corresponding set of node identifiers, each node identifier corresponding to a unique signature voltage ratio; comparing voltages received at a first and second measuring point on a bus, the voltages resulting from a message transmitted by a sending node on the bus, the first measuring point providing a first voltage and the second measuring point providing a second voltage; calculating a test voltage ratio from the first voltage and the second voltage; determining whether the test voltage ratio is in the set of signature voltage ratios; and initiating a security response based on whether the test voltage ratio is in the set of signature voltage ratios.

In Example 17, the subject matter of Example 16 includes, receiving the message transmitted on the bus; and determining the first voltage.

In Example 18, the subject matter of Example 17 includes, wherein determining the first voltage comprises: obtaining a plurality of sample voltages from the message, provided by the voltage measurement circuitry; and calculating the first voltage form the plurality of sample voltages.

In Example 19, the subject matter of Example 18 includes, wherein calculating the first voltage from the number of voltages comprises calculating an average voltage from the plurality of sample voltages, and using the average voltage as the first voltage.

In Example 20, the subject matter of Examples 18-19 includes, wherein calculating the first voltage from the number of voltages comprises calculating a median voltage from the plurality of sample voltages, and using the median voltage as the first voltage.

In Example 21, the subject matter of Examples 16-20 includes, wherein the bus is a controller area network (CAN) bus.

In Example 22, the subject matter of Example 21 includes, wherein the voltages are off of a high bus line (CANH).

In Example 23, the subject matter of Examples 21-22 includes, wherein the voltages are off of a low bus line (CANL).

In Example 24, the subject matter of Examples 21-23 includes, wherein the voltages are off of a high bus line (CANH) and a low bus line (CANL), and wherein the test voltage ratio is associated with CANH and a second test voltage ratio is associated with CANL.

In Example 25, the subject matter of Examples 16-24 includes, wherein initiating the security response comprises: determining that the test voltage ratio is not in the set of signature voltage ratios; and disabling the sending node.

In Example 26, the subject matter of Examples 16-25 includes, wherein initiating the security response comprises: determining that the test voltage ratio is not in the set of signature voltage ratios; and recording the sending node in a security log.

In Example 27, the subject matter of Examples 16-26 includes, wherein initiating the security response comprises: determining that the test voltage ratio is in the set of signature voltage ratios; determining a message identifier from the message; and determining whether the sending node is allowed to transmit the message with the message identifier.

In Example 28, the subject matter of Example 27 includes, disabling the sending node when the sending node is not allowed to transmit the message with the message identifier.

In Example 29, the subject matter of Examples 27-28 includes, recording the sending node in a security log when the sending node is not allowed to transmit the message with the message identifier.

Example 30 is at least one machine-readable medium including instructions, which when executed by a machine, cause the machine to perform operations of any of the methods of Examples 16-29.

Example 31 is an apparatus comprising means for performing any of the methods of Examples 16-29.

Example 32 is an apparatus for intrusion detection, the apparatus comprising: means for storing a set of signature voltage ratios and a corresponding set of node identifiers, each node identifier corresponding to a unique signature voltage ratio; means for comparing voltages received at a first and second measuring point on a bus, the voltages resulting from a message transmitted by a sending node on the bus, the first measuring point providing a first voltage and the second measuring point providing a second voltage; means for calculating a test voltage ratio from the first voltage and the second voltage; means for determining whether the test voltage ratio is in the set of signature voltage ratios; and means for initiating a security response based on whether the test voltage ratio is in the set of signature voltage ratios.

In Example 33, the subject matter of Example 32 includes, means for receiving the message transmitted on the bus; and means for determining the first voltage.

In Example 34, the subject matter of Example 33 includes, wherein the means for determining the first voltage comprise: means for obtaining a plurality of sample voltages from the message, provided by the voltage measurement circuitry, and means for calculating the first voltage form the plurality of sample voltages.

In Example 35, the subject matter of Example 34 includes, wherein the means for calculating the first voltage from the number of voltages comprise means for calculating an average voltage from the plurality of sample voltages, and using the average voltage as the first voltage.

In Example 36, the subject matter of Examples 34-35 includes, wherein the means for calculating the first voltage from the number of voltages comprise means for calculating a median voltage from the plurality of sample voltages, and using the median voltage as the first voltage.

In Example 37, the subject matter of Examples 32-36 includes, wherein the bus is a controller area network (CAN) bus.

In Example 38, the subject matter of Example 37 includes, wherein the voltages are off of a high bus line (CANH).

In Example 39, the subject matter of Examples 37-38 includes, wherein the voltages are off of a low bus line (CANL).

In Example 40, the subject matter of Examples 37-39 includes, wherein the voltages are off of a high bus line (CANH) and a low bus line (CANL), and wherein the test voltage ratio is associated with CANH and a second test voltage ratio is associated with CANL.

In Example 41, the subject matter of Examples 32-40 includes, wherein the means for initiating the security response comprise: means for determining that the test voltage ratio is not in the set of signature voltage ratios; and means for disabling the sending node.

In Example 42, the subject matter of Examples 32-41 includes, wherein the means for initiating the security response comprise: means for determining that the test voltage ratio is not in the set of signature voltage ratios; and means for recording the sending node in a security log.

In Example 43, the subject matter of Examples 32-42 includes, wherein the means for initiating the security response comprise: means for determining that the test voltage ratio is in the set of signature voltage ratios; means for determining a message identifier from the message; and means for determining whether the sending node is allowed to transmit the message with the message identifier.

In Example 44, the subject matter of Example 43 includes, means for disabling the sending node when the sending node is not allowed to transmit the message with the message identifier.

In Example 45, the subject matter of Examples 43-44 includes, means for recording the sending node in a security log when the sending node is not allowed to transmit the message with the message identifier.

Example 46 is at least one machine-readable medium including instructions for intrusion detection, which when executed by a machine, cause the machine to perform the operations comprising: implementing memory to store a set of signature voltage ratios and a corresponding set of node identifiers, each node identifier corresponding to a unique signature voltage ratio; comparing voltages received at a first and second measuring point on a bus, the voltages resulting from a message transmitted by a sending node on the bus, the first measuring point providing a first voltage and the second measuring point providing a second voltage; calculating a test voltage ratio from the first voltage and the second voltage; determining whether the test voltage ratio is in the set of signature voltage ratios; and initiating a security response based on whether the test voltage ratio is in the set of signature voltage ratios.

In Example 47, the subject matter of Example 46 includes, receiving the message transmitted on the bus; and determining the first voltage.

In Example 48, the subject matter of Example 47 includes, wherein determining the first voltage comprises: obtaining a plurality of sample voltages from the message, provided by the voltage measurement circuitry; and calculating the first voltage form the plurality of sample voltages.

In Example 49, the subject matter of Example 48 includes, wherein calculating the first voltage from the number of voltages comprises calculating an average voltage from the plurality of sample voltages, and using the average voltage as the first voltage.

In Example 50, the subject matter of Examples 48-49 includes, wherein calculating the first voltage from the number of voltages comprises calculating a median voltage from the plurality of sample voltages, and using the median voltage as the first voltage.

In Example 51, the subject matter of Examples 46-50 includes, wherein the bus is a controller area network (CAN) bus.

In Example 52, the subject matter of Example 51 includes, wherein the voltages are off of a high bus line (CANH).

In Example 53, the subject matter of Examples 51-52 includes, wherein the voltages are off of a low bus line (CANL).

In Example 54, the subject matter of Examples 51-53 includes, wherein the voltages are off of a high bus line (CANH) and a low bus line (CANL), and wherein the test voltage ratio is associated with CANH and a second test voltage ratio is associated with CANL.

In Example 55, the subject matter of Examples 46-54 includes, wherein initiating the security response comprises: determining that the test voltage ratio is not in the set of signature voltage ratios; and disabling the sending node.

In Example 56, the subject matter of Examples 46-55 includes, wherein initiating the security response comprises: determining that the test voltage ratio is not in the set of signature voltage ratios; and recording the sending node in a security log.

In Example 57, the subject matter of Examples 46-56 includes, wherein initiating the security response comprises: determining that the test voltage ratio is in the set of signature voltage ratios; determining a message identifier from the message; and determining whether the sending node is allowed to transmit the message with the message identifier.

In Example 58, the subject matter of Example 57 includes, disabling the sending node when the sending node is not allowed to transmit the message with the message identifier.

In Example 59, the subject matter of Examples 57-58 includes, recording the sending node in a security log when the sending node is not allowed to transmit the message with the message identifier.

Example 60 is at least one machine-readable medium including instructions که, when executed by processing circuitry, cause the processing circuitry to perform operations to implement of any of Examples 1-59.

Example 61 is an apparatus comprising means to implement of any of Examples 1-59.

Example 62 is a system to implement of any of Examples 1-59.

Example 63 is a method to implement of any of Examples 1-59.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second." and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. An electronic device for intrusion detection, the device comprising:
   memory circuitry to store a set of signature voltage ratios and a corresponding set of node identifiers, each node identifier corresponding to a unique signature voltage ratio; and
   security circuitry to:
     compare voltages received at a first and second measuring point on a bus, the voltages resulting from a message transmitted by a sending node on the bus, the first measuring point providing a first voltage and the second measuring point providing a second voltage;
     calculate a test voltage ratio from the first voltage and the second voltage;
     determine whether the test voltage ratio is in the set of signature voltage ratios; and
     initiate a security response based on whether the test voltage ratio is in the set of signature voltage ratios.

2. The device of claim 1, wherein the device comprises the first measuring point on the bus.

3. The device of claim 2, further comprising:
   transceiver circuitry to receive the message transmitted on the bus; and
   voltage measurement circuitry to determine the first voltage.

4. The device of claim 3, wherein to determine the first voltage, the security circuitry is to:
   obtain a plurality of sample voltages from the message, provided by the voltage measurement circuitry; and
   calculate the first voltage form the plurality of sample voltages.

5. The device of claim 4, wherein to calculate the first voltage from the number of voltages, the security circuitry is to calculate an average voltage from the plurality of sample voltages, and use the average voltage as the first voltage.

6. The device of claim 4, wherein to calculate the first voltage from the number of voltages, the security circuitry is to calculate a median voltage from the plurality of sample voltages, and use the median voltage as the first voltage.

7. The device of claim 1, wherein the bus is a controller area network (CAN) bus.

8. The device of claim 7, wherein the voltages are off of a high bus line (CANH).

9. The device of claim 7, wherein the voltages are off of a low bus line (CANL).

10. The device of claim 7, wherein the voltages are off of a high bus line (CANH) and a low bus line (CANL), and wherein the test voltage ratio is associated with CANH and a second test voltage ratio is associated with CANL.

11. The device of claim 1, wherein to initiate the security response, the security circuitry is to:
    determine that the test voltage ratio is not in the set of signature voltage ratios; and
    disable the sending node.

12. The device of claim 1, wherein to initiate the security response, the security circuitry is to:
    determine that the test voltage ratio is not in the set of signature voltage ratios; and
    record the sending node in a security log.

13. The device of claim 1, wherein to initiate the security response, the security circuitry is to:
    determine that the test voltage ratio is in the set of signature voltage ratios;
    determine a message identifier from the message; and determine whether the sending node is allowed to transmit the message with the message identifier.

14. The device of claim 13, wherein the security circuitry is to disable the sending node when the sending node is not allowed to transmit the message with the message identifier.

15. The device of claim 13, wherein the security circuitry is to record the sending node in a security log when the sending node is not allowed to transmit the message with the message identifier.

16. A method of intrusion detection, the method comprising:
implementing memory to store a set of signature voltage ratios and a corresponding set of node identifiers, each node identifier corresponding to a unique signature voltage ratio;
comparing voltages received at a first and second measuring point on a bus, the voltages resulting from a message transmitted by a sending node on the bus, the first measuring point providing a first voltage and the second measuring point providing a second voltage;
calculating a test voltage ratio from the first voltage and the second voltage;
determining whether the test voltage ratio is in the set of signature voltage ratios; and
initiating a security response based on whether the test voltage ratio is in the set of signature voltage ratios.

17. The method of claim 16, further comprising:
receiving the message transmitted on the bus; and
determining the first voltage.

18. The method of claim 17, wherein determining the first voltage comprises:
obtaining a plurality of sample voltages from the message, provided by the voltage measurement circuitry; and
calculating the first voltage form the plurality of sample voltages.

19. The method of claim 18, wherein calculating the first voltage from the number of voltages comprises calculating an average voltage from the plurality of sample voltages, and using the average voltage as the first voltage.

20. The method of claim 18, wherein calculating the first voltage from the number of voltages comprises calculating a median voltage from the plurality of sample voltages, and using the median voltage as the first voltage.

21. At least one non-transitory machine-readable medium including instructions for intrusion detection, which when executed by a machine, cause the machine to perform the operations comprising:
implementing memory to store a set of signature voltage ratios and a corresponding set of node identifiers, each node identifier corresponding to a unique signature voltage ratio;
comparing voltages received at a first and second measuring point on a bus, the voltages resulting from a message transmitted by a sending node on the bus, the first measuring point providing a first voltage and the second measuring point providing a second voltage;
calculating a test voltage ratio from the first voltage and the second voltage;
determining whether the test voltage ratio is in the set of signature voltage ratios; and
initiating a security response based on whether the test voltage ratio is in the set of signature voltage ratios.

22. The at least one machine-readable medium of claim 21, wherein initiating the security response comprises:
determining that the test voltage ratio is not in the set of signature voltage ratios; and
recording the sending node in a security log.

23. The at least one machine-readable medium of claim 21, wherein initiating the security response comprises:
determining that the test voltage ratio is in the set of signature voltage ratios;
determining a message identifier from the message; and
determining whether the sending node is allowed to transmit the message with the message identifier.

24. The at least one machine-readable medium of claim 23, further comprising disabling the sending node when the sending node is not allowed to transmit the message with the message identifier.

25. The at least one machine-readable medium of claim 23, further comprising recording the sending node in a security log when the sending node is not allowed to transmit the message with the message identifier.

* * * * *